United States Patent [19]
Kelly

[11] Patent Number: 5,613,565
[45] Date of Patent: Mar. 25, 1997

[54] LAWN AERATOR ASSEMBLY

[76] Inventor: Robert T. Kelly, 10024 S. Forest, Chicago, Ill. 60626

[21] Appl. No.: 508,929

[22] Filed: Jul. 28, 1995

[51] Int. Cl.$^6$ ................................................ A01B 45/02
[52] U.S. Cl. ........................................ 172/21; 172/349
[58] Field of Search ........................... 172/21, 22, 355, 172/349, 329, 256, 122, 42; 404/131, 122; 56/249

[56] References Cited

U.S. PATENT DOCUMENTS

| | | | |
|---|---|---|---|
| 176,963 | 5/1876 | Johnson | 172/355 X |
| 602,285 | 4/1898 | Fiscus | 172/354 |
| 788,421 | 4/1905 | McInnerny | 172/354 X |
| 1,887,334 | 11/1932 | Spaeth | 172/21 X |
| 1,898,214 | 2/1933 | Richards . | |
| 2,580,236 | 12/1951 | Mascaro | 172/21 |
| 2,741,968 | 4/1956 | Harris | 172/21 X |
| 2,879,852 | 3/1959 | Ellerman | 172/355 |
| 2,966,218 | 12/1960 | Johnson | 172/21 X |
| 2,975,735 | 3/1961 | Purvance | 172/21 X |
| 3,171,498 | 3/1965 | Logan | 172/22 |
| 3,199,278 | 8/1965 | Dye | 172/21 X |
| 3,881,553 | 5/1975 | Angeski | 172/22 |
| 4,854,391 | 8/1989 | Johnson | 172/354 |
| 5,014,791 | 5/1991 | Kure | 172/21 |
| 5,398,769 | 3/1995 | Staples | 172/21 |
| 5,450,910 | 9/1995 | Strzyzewski | 172/21 X |

FOREIGN PATENT DOCUMENTS

| | | | |
|---|---|---|---|
| 1068497 | 11/1959 | Germany | 172/21 |
| 644244 | 10/1950 | United Kingdom | 172/21 |
| 913349 | 12/1962 | United Kingdom | 172/21 |

*Primary Examiner*—Terry Lee Melius
*Assistant Examiner*—Christopher J. Novosad
*Attorney, Agent, or Firm*—Kajane McManus

[57] ABSTRACT

The lawn aerator assembly includes a rotatable spined drum which is mounted to a wheeled handle member in a manner to be transportable across non-lawn areas without the drum coming into contact with such non-lawn areas.

5 Claims, 1 Drawing Sheet

LAWN AERATOR ASSEMBLY

BACKGROUND OF THE INVENTION

1. Field of the Invention

The present invention relates to a lawn aerator assembly which can be transported easily across non-lawn areas during use without damaging such non-lawn areas.

2. Prior Art

Heretofore, various lawn aerator configurations have been proposed. Examples of such proposed configurations may be found in the following U.S. Patents:

| U.S. Pat. No. | Patentee |
| --- | --- |
| D. L. Richards | 1,898,214 |
| F. B. Logan | 3,171,498 |
| Clarke H. Staples | 5,398,769 |

None of these configurations provide an extension arrangement which is wheeled so that the assembly can be "flipped over" by the handle for transport across a non-lawn surface.

SUMMARY OF THE INVENTION

According to the invention there is provided a wheeled lawn aerator assembly comprising a spined drum rotatably mounted to an elongate handle member having wheels at one end thereof and a graspable handle at another end thereof.

DESCRIPTION OF THE PREFERRED EMBODIMENT

Figure 1:
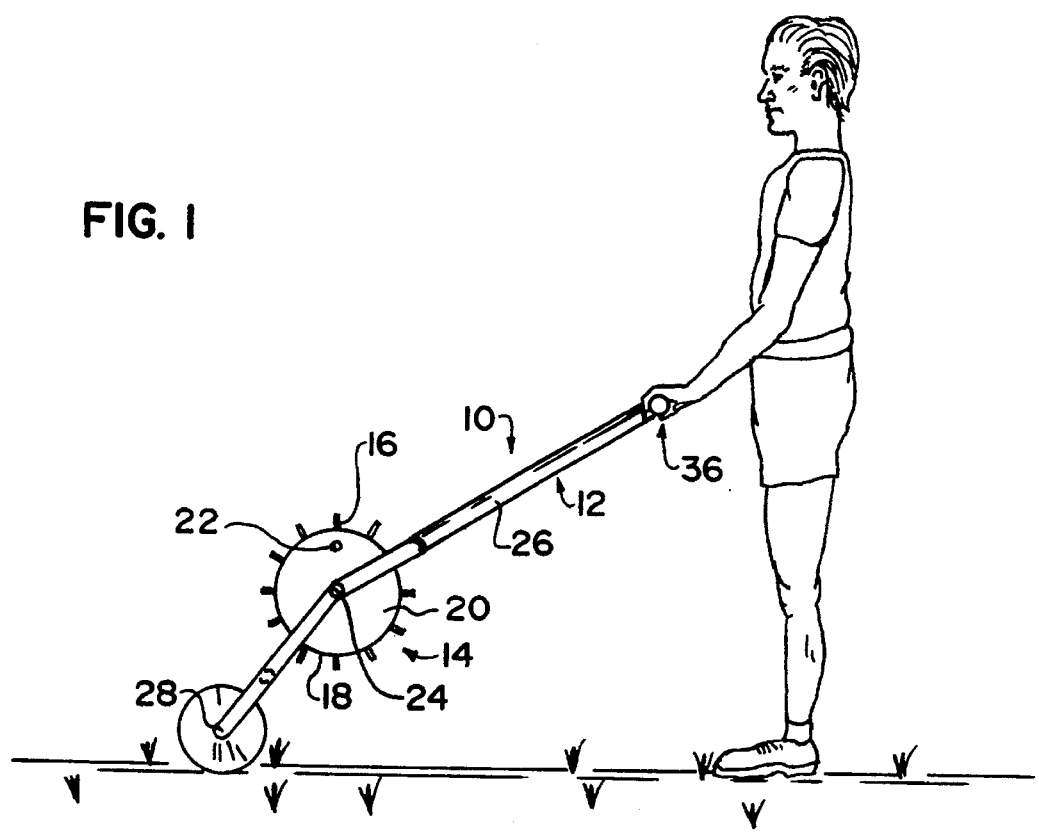
FIG. 1 is a side view of the aerator showing same in a transport position thereof.
Figure 2:
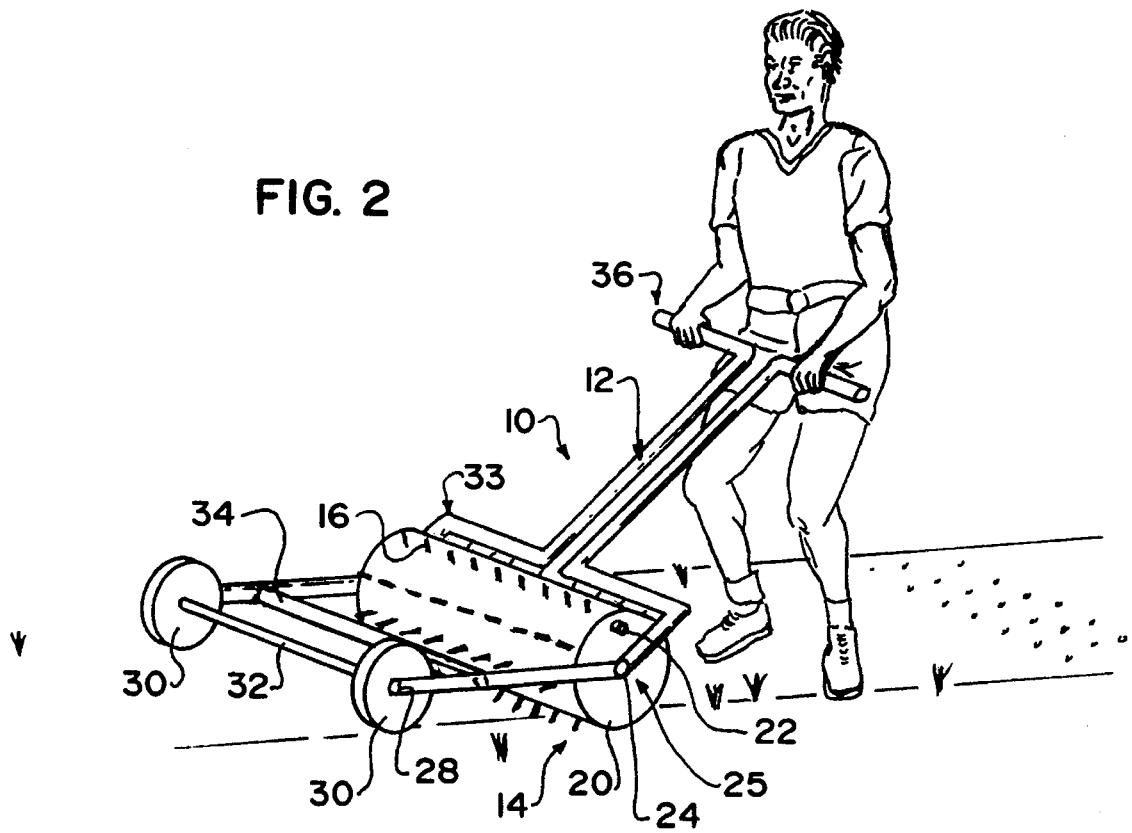
FIG. 2 is a perspective view of the lawn aerator assembly showing same in an aerating position thereof.

Referring now to the drawings in greater detail, there is illustrated therein the lawn aerator assembly made in accordance with the teachings of the present invention and generally identified by the reference numeral 10.

As shown, the assembly 10 has two main components, an elongate angled handle member 12 and a rotatable spined drum 14 mounted to the handle member 12 in a workable manner.

The drum 14 is a closed cylindrical structure having a plurality of radially extending spines 16 extending outwardly from an outer surface 18 of the drum 14.

The drum 14 is closed, having two end walls 20, one of which includes a fill and drain port 22 therein allowing access to the interior of the drum 12.

Each end wall 20 is further provided thereon with a centered mounting bracket 24 which allows for rotational mounting of the drum 14 to the handle member 12, in known manner.

The handle member 12 is defined by first and second mirror image elongate arms 26 which each have a corresponding point of flexure 25 along the length thereof. It is at this point of flexure that the drum 14 is rotatably mounted to and between the elongate arms 26 by means of the bracket 24.

The interior of the drum 14 is hollow and such interior of the drum 14 may be filled with a substance such as water or sand via the port 22 to provided a weighted drum 14. With the drum 14 being weighted, as one pushes or pulls the drum 14 across a lawn area, the spines 16 on the outer surface 18 thereof lying across the ground at any given moment as the drum 14 rotates will be forced into the ground by the weight of the drum 14, aerating the lawn therebeneath.

It is often the case that one must cross a driveway or sidewalk on the way to the lawn area. Obviously, it is detrimental to such surface to have a spined object roll thereacross.

To provide for hand graspability of the assembly the arms 26 of the handle member 12 extend to an end 28 beyond joining to the drum 14 and each terminates with a wheel 30 thereon. The wheels 30 are engaged to one another across the area between the arms 26 by a mounting shaft 32, upon which the wheels 30 are rotatably mounted, with the shaft 32 being mounted in turn to and between the ends 28 of the arms 26. Such engagement may be formed in any known suitable manner.

To provide for stability of the arms 26 relative to one another, a brace 34 may be engaged to and between the arms 26 at a point between the wheeled ends 28 and the point of flexure 25, where the drum 14 is engaged.

The arms 26 form the handle member 12 by turning inwardly toward one another at a point 33 where such inward disposition will not interfere with turning of the splined drum 14. From this point 33 the arms 26 extend together to an end 36 of the handle member 12 where the arms 26 diverge from one another to provide a T shaped end configuration to the handle member 12, providing a hand grasp for the assembly 10.

To transport the assembly 10 across a non-lawn area, one need merely "flip" the assembly 10 over, about an axis formed between the wheels 30.

Then, when one comes to a further lawn area, the assembly 10 need merely be "flipped over" again for use.

As described above, the assembly 10 provides a number of advantages, some of which have been described above and others of which are inherent in the invention. Also modifications can be proposed to the assembly 10 without departing from the teachings herein. Accordingly, the scope of the invention is only to be limited as necessitated by the accompanying claims.

I claim:

1. A wheeled lawn aerator comprising a fillable fluid tight spined drum rotatably mounted to an elongate handle member having wheels at one end thereof adjacent the drum and a graspable handle at another end thereof, the elongate handle member comprising two mirror image arms to and between which the drum is engaged, the arms being identically flexed at a point of engagement of the drum and wherein a brace is engaged to and between the mirror image arms at a point between the drum and the wheels.

2. The assembly of claim 1 wherein the drum is a hollow cylindrical member having a sidewall at each end thereof.

3. The assembly of claim 2 wherein one sidewall includes a fill point therein.

4. The assembly of claim 3 wherein the wheels are each mounted to a shaft.

5. The assembly of claim 4 wherein said shaft is rotatably mounted to and between the mirror image arms.

* * * * *